United States Patent [19]

Corsi

[11] 4,121,332
[45] Oct. 24, 1978

[54] MACHINE TOOL COMPRISING A SINGLE SPINDLE, ADAPTED TO AUTOMATICALLY TAKE UP BOTH THE HORIZONTAL AND THE VERTICAL POSITION, AND A SINGLE DEVICE FOR THE AUTOMATIC CHANGE OF THE TOOLS

[75] Inventor: Armando Corsi, Piacenza, Italy

[73] Assignee: Mandelli S.p.A., Piacenza, Italy

[21] Appl. No.: 675,803

[22] Filed: Apr. 12, 1976

[30] Foreign Application Priority Data

Apr. 14, 1975 [IT] Italy ............................ 22275 A/75

[51] Int. Cl.² ............................................ B23Q 3/157
[52] U.S. Cl. .................................................... 29/568
[58] Field of Search ............................ 29/568, 26 A

[56] References Cited

U.S. PATENT DOCUMENTS

| 3,544,286 | 12/1970 | Oeckl et al. | 29/568 |
| 3,760,491 | 9/1973 | Zankl et al. | 29/568 |
| 3,762,036 | 10/1973 | Goebel et al. | 29/568 |
| 3,821,844 | 7/1974 | Harman et al. | 29/568 |
| 3,953,918 | 5/1976 | Bowe et al. | 29/568 |

FOREIGN PATENT DOCUMENTS 2,264,080  7/1974  Fed. Rep. of Germany ............. 29/568

*Primary Examiner*—Z. R. Bilinsky
*Attorney, Agent, or Firm*—Young & Thompson

[57] ABSTRACT

A machine tool, designed for volume production, comprises a head with a single spindle, rotatably mounted about an axis, inclined by 45° in respect of the horizontal working plane of the machine. Automatic control means allow said head to take up at least the two positions corresponding to the horizontal spindle position and to the vertical position, while a single device is provided for the automatic change of the tools, adapted to change the tools on the spindle of said head, when the latter takes up one of said two positions.

4 Claims, 10 Drawing Figures

MACHINE TOOL COMPRISING A SINGLE SPINDLE, ADAPTED TO AUTOMATICALLY TAKE UP BOTH THE HORIZONTAL AND THE VERTICAL POSITION, AND A SINGLE DEVICE FOR THE AUTOMATIC CHANGE OF THE TOOLS

BACKGROUND OF THE INVENTION

The present invention relates to important improvements in highly advanced machine tools, and it particularly refers to a special head for machine tools, through which it is possible to place the single spindle provided thereon — by means of an automatic control — both in the horizontal and in the vertical position. The invention also relates to a machine tool equipped with said head and provided with a single device for automatically changing the tools on said spindle.

Machine tools comprising a single stationary spindle and means for automatically changing the tools on said spindle, have already been known for some time.

On the other hand, machine tools are also known to comprise two stationary orthogonal spindles, one being vertical and the other horizontal. In such machines, however, the change of the tools has so far not been automatic, due to the difficulty of having to mount simultaneously — as would have been required — two devices for the automatic change of the tools.

At present, one of the most felt requirements in this field — which is in constant intensive development — is hence to be able to dispose of a machine tool allowing to perform operations, both with a horizontal and with a vertical spindle, and allowing at the same time, to perform the automatic change of the tools.

The Applicant has faced this problem and has solved it in the most efficient way by drawing inspiration, partly from the already cited solutions of prior art, concerning volume production machine tools, and partly from a solution adopted in the past for machine tools of an entirely different type from that which the Applicant intended to realize, and meant for different purposes, that is, machine tools designed for the production, in single pieces and under the constant control of a skilled operator, of fixtures and the like. Some of these machines comprise a head in two parts, one of which, carrying the spindle, may be manually rotated in respect of the other — which is fixed to the machine casing or to a slide thereof — about an axis inclined by 45° in respect of the working plane, and being perpendicular to the plane separating the two head parts, which is also inclined by 45°. In such machine tools, the rotary part of the head carrying the spindle is moved manually by the operator so as to set the spindle in an infinite number of positions, between the vertical spindle position and the horizontal spindle position, hence allowing to choose the most appropriate positions for specific types of machining operations, as are required for the production of fixtures and the like.

SUMMARY OF THE INVENTION

Starting from the heretofore illustrated prior art, a machine tool has been conceived, of the advanced type designed for volume production, being characterized by a head with a single spindle, rotatably mounted about an axis, inclined by 45° in respect of the horizontal working plane of the machine; by automatic control means, allowing said head to take up at least the two positions corresponding to the horizontal spindle position and to the vertical spindle position; and by a single device for the automatic change of the tools, adapted to change the tools on the spindle of said head, when the latter takes up one of said two positions.

Preferably, in this machine, the working plane is stationary and the head is carried by an upright, movable in two orthogonal directions lying on a horizontal plane.

A machine of this type allows to obtain results — never achieved so far, yet greatly desired — which make it possible to work in a fully automatic way and with a program depending on the machining requirements, according to two perpendicular axes. A further advantage lies in the fact of being able to keep stationary the piece being machined, during the whole machining operation, which is very important in the case of pieces of considerable weight and size.

At present, in the field of machine tools, the above results and the simple and rational manner of obtaining the same, according to the present invention, acquire an importance which should no doubt be considered exceptional, as has been widely confirmed by the first World Exhibition of Machine Tools (EMO), held in Paris in June 1975, a few months after the filing of the Italian Patent application, the priority of which is being claimed by the present application.

In fact, the first EMO has proved first of all how felt and important the problem was to concentrate into a single operating centre all the machining operations having to be performed on a single piece, and moreover, how unexpected and original was the solution to this problem provided by the present invention.

In fact, the only alternative solution to said problem — provided at the first EMO in Paris, in June 1975 — was that of combining into a single, very bulky and costly unit, two large machine tools, both with automatic change of the tools and adapted to work, one exclusively with a vertical spindle and the other exclusively with a horizontal spindle, by resorting to the complicated expedient of connecting said machine tools by means of an automatic conveyor.

Such a solution (provided by a world-known and fully reliable firm, such as OLIVETTI) shows how — in confirmation of the importance of this problem and of the world-wide interest in finding a solution for the same — every possible effort has been made in order to obtain a mechanical unit, adapted to work automatically and with a single program along two perpendicular axes. On the other hand, it should be emphasized that, without a highly inventive idea, it would have been impossible to realize the simple and rational arrangement according to the invention, as is proved by the fact that highly skilled and trained technicians did not hesitate — in order to solve the same problem — to resort to a far more complicated and costly (as well as less compact and practical) solution.

It should be noted, further, that the originality and efficiency of the solution according to the invention, have also been confirmed by the exceptional success and huge interest aroused at all levels — on the occasion of the first EMO in Paris — in the machine tool according to the invention, which success and interest have also been confirmed by the international press specialized in the field.

BRIEF DESCRIPTION OF THE DRAWINGS

The invention will now be described in further detail, with reference to the accompanying drawings, which represent a preferred embodiment thereof and in which.

DESCRIPTION OF THE PREFERRED EMBODIMENT

Figure 1:
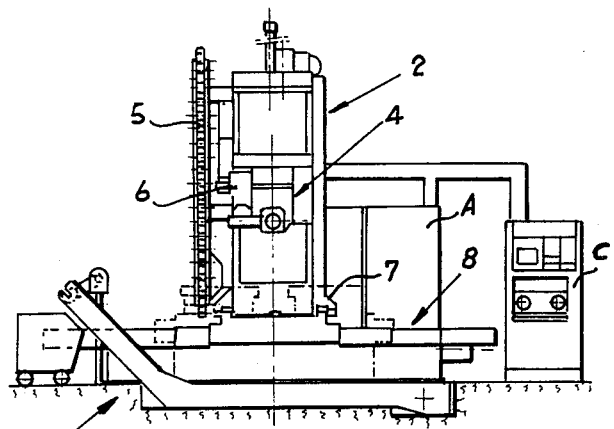
FIG. 1 is a schematic front view of an embodiment of the improved machine tool according to the invention.

In the first three figures of the drawings, is illustrated a machine tool comprising a base 1, a vertical upright 2, and a stationary working table 3. On the vertical upright 2 are mounted the movable head 4, equipped with the tool-carrying spindle, and moreover, a tool-store 5 and a tool-changing device 6.

The vertical upright 2 is movable on a slide 7, towards and away from the working table 3, and it is adapted to move in a direction perpendicular to the previous one, thanks to a structure 8 with telescopic square elements 9, on the central part of which is mounted the slide 7.

In the embodiment illustrated, the stationary working table 3 carries two round tables 3' rotating on a base 10; such a working table could however be replaced by another type of working table or by other fixtures for supporting the pieces to be machined. By using two tables, as in the figure, it is possible to perform a combined simultaneous machining operation on two pieces, in a crosshunting cycle.

The tool-store 5 is of the type comprising a vertical endless chain, arranged on one side of the upright 2.

Reference A indicates a cabinet holding the electric and electronic equipment operating the machine, while reference C indicates a control and/or checking panel.

Figure 4:
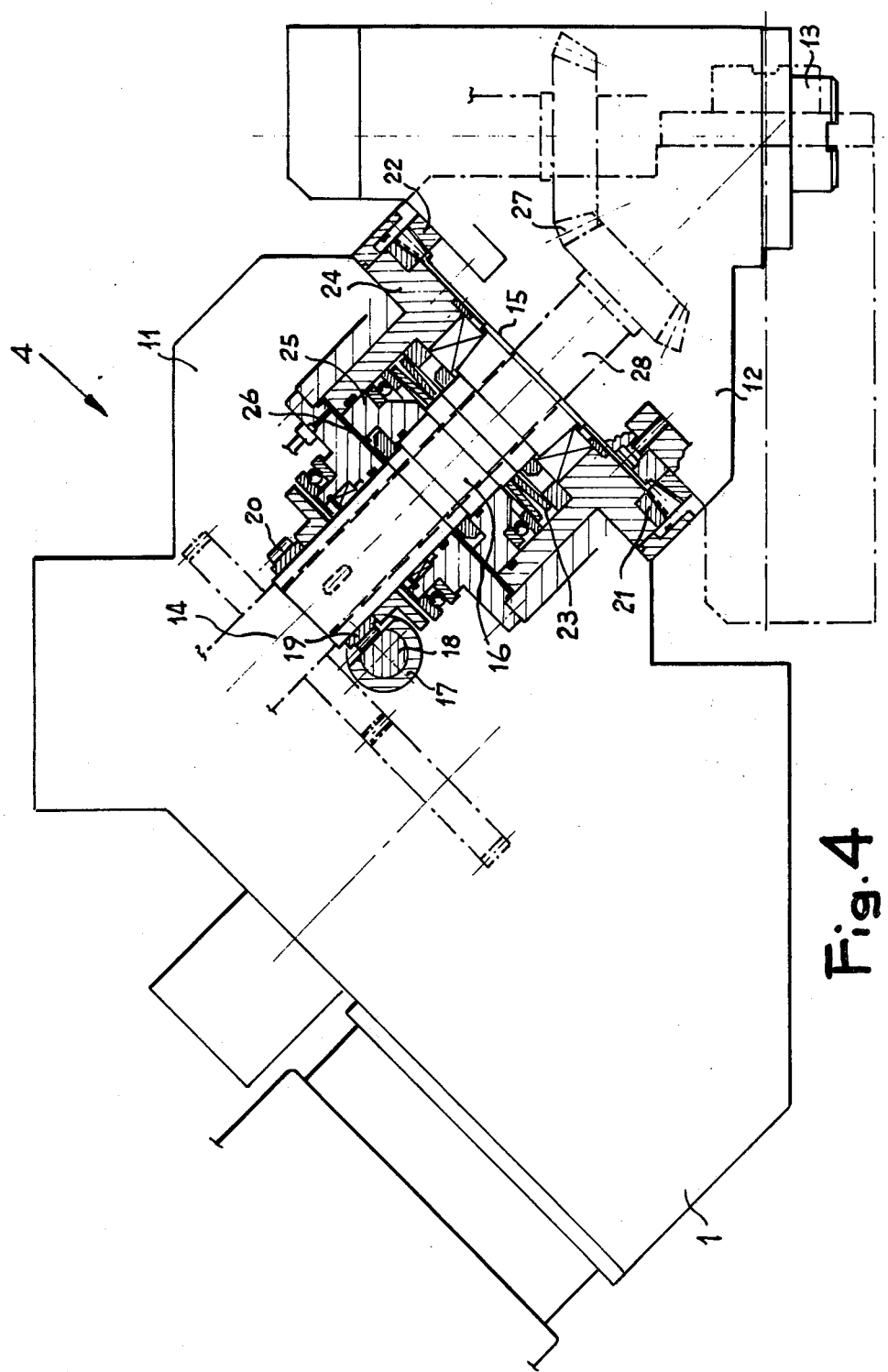
FIG. 4 is a detailed side view, with some parts in section, of the head of the machine tool according to FIGS. 1 to 3.

As shown in detail in FIG. 4, the head 4 of the upright 2, adapted to move vertically on the upright itself, comprises — according to the invention — a fixed part 11 and a movable part 12, carrying a single spindle 13.

Figure 2:
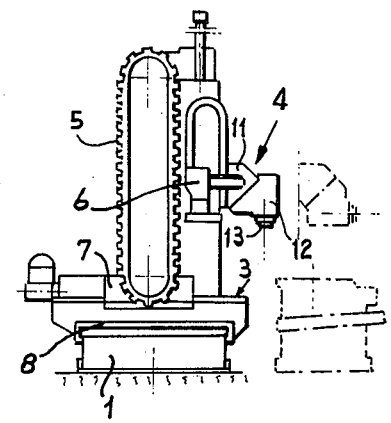
FIG. 2 is a side view of the same machine tool, wherein the head is shown in the position with vertical spindle, while the horizontal spindle position is marked with dashed lines on the right side of the figure.
Figure 3:
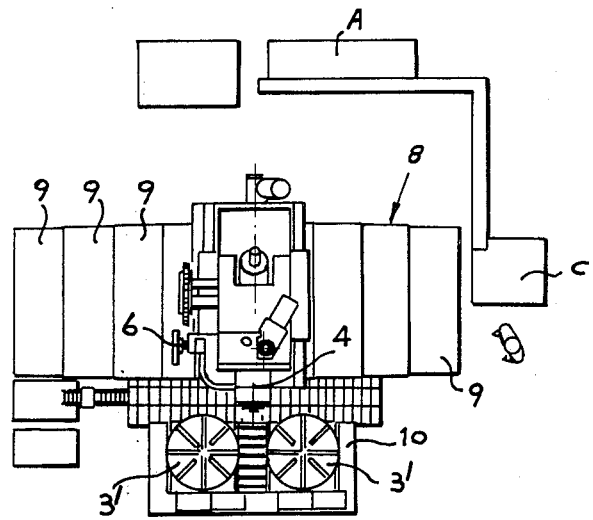
FIG. 3 is a plan view of the machine tool according to FIGS. 1 and 2.

The fixed part 11 is carried by the vertical upright 2 (FIGS. 1 to 3) which is adapted — as already seen — to perform orthogonal movements in respect of the base 1: this allows to keep the piece being machined quite stationary in the working plane, during performance of the various operations to which it has to be subjected.

The movable part 12 is rotatably mounted in respect of the fixed part 11, about an axis 14 inclined by 45° in respect of the horizontal working plane of the machine, the two parts facing each other according to a plane 15 perpendicular to the axis 14.

The movable part 12 is mounted on the fixed part 11 by means of a hollow shaft 16, projecting from said part 12 perpendicularly to the plane 15 and according to the axis 14, said shaft 16 penetrating into an appropriate corresponding cylindrical seat of the part 11. Into the body of part 11 is inserted a hydraulic cylinder 17, the piston 18 of which, provided with rack 19, engages with a gearwheel 20 carried by the end of the hollow shaft 16.

Between the fixed part 11 and the movable part 12 of the head 4 shown in FIG. 4, are inserted two high precision crown gears 21 and 22, with front coupling, the mutual engagement of which is guaranteed by the direct action of a set of very strong Belleville washers 23, acting between the bush 24, connected to the part 11, and the bush 25, connected to the hollow shaft 16 of the part 12. Said crown gears 21 and 22 may be disengaged by introducing oil under pressure into the chamber 26, to overcome the action of the washers 23 on the bush 25.

In the drawing, the vertical position of the spindle 13 is shown in full lines. Motion is imparted to the spindle 13, through a bevel gear pair 27, by a drive shaft 28 housed inside the hollow shaft 16, said drive shaft being in turn controlled by the driving means of the machine tool head.

In the same FIG. 4, the horizontal position of the spindle 13 is shown in dashed lines.

If the machining operation to be performed requires the vertical position of the spindle 13, the machine tool according to the invention will operate in the condition shown in full lines in FIG. 4. In this condition, the precision of the spindle position is guaranteed by the precision of the position of the head part 12 in respect of the head part 11, thanks to the precise engagement between the crown gears 21 and 22 with front coupling.

When having to place the spindle in the horizontal position, oil under pressure is pressed into the chamber 26, so as to overcome the action of the washers 23, hence moving away the head part 12 from the head part 11, by disengagement of the crown gears 21 and 22. Oil under pressure is then let into the cylinder 17, the piston 18 of which moves, causing with its rack 19 the rotation of the gearwheel 20 and of the hollow shaft 16. The head part 12 consequently rotates to place the spindle 13 — thanks to the fact that the rotation takes place about an axis (14) inclined by 45° — in the horizontal position (condition shown in dashed lines in FIG. 4). At this point, the oil pressure is removed inside the chamber 26 and the action of the washers 23, no longer opposed, rigidly locks in the new position the crown gears 21 and 22, and hence the head parts 11 and 12.

All the heretofore described operations are controlled and performed automatically, according to a predetermined sequence, through an electro-hydraulic unit with known-type consent and safety means. The stroke of the piston 18, causing the rotation of the head part 12, is instead controlled by mechanical stops.

Once there is a head with single spindle, adapted to take up the two desired horizontal and vertical positions, there are no difficulties in operating the automatic change of the tools on said spindle, in one of said two positions, so as to get the machine tool to work in a fully automatic way, according to a predetermined schedule.

FIGS. 5 to 10 show, by mere way of example, how to provide for changing the tools: these figures illustrate the head 4 of the machine, carried by the upright 2, with the spindle 13 in a horizontal position; a tool-changing device 6 slides on a track 30, between a tool-store 5 and the spindle 13, along a curved horizontal path; said device 6 comprises a movable carriage 32 and a gripping and delivery arm 33 for exchanging the tools U, said arm rotating in a vertical plane between two horizontal positions angularly spaced by 180°.

Figure 5:
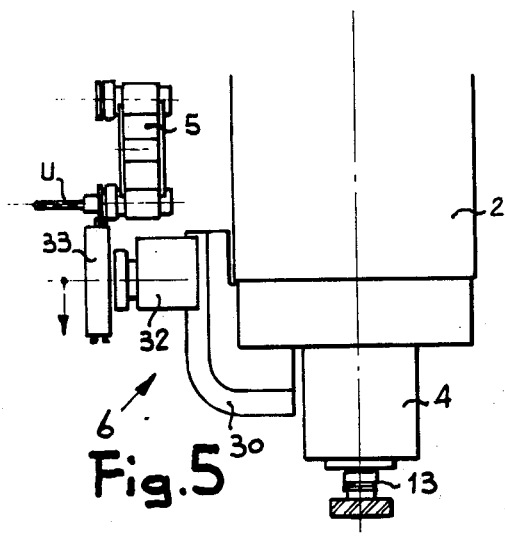
FIGS. 5 to 10 are fully schematic top views, showing the working of the arrangement for changing the tools, adopted on the machine tool according to FIGS. 1 to 4.
Figure 6:
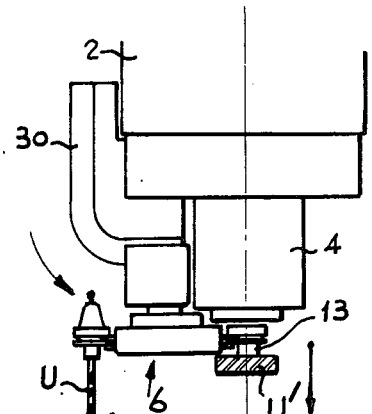
Figure 7:
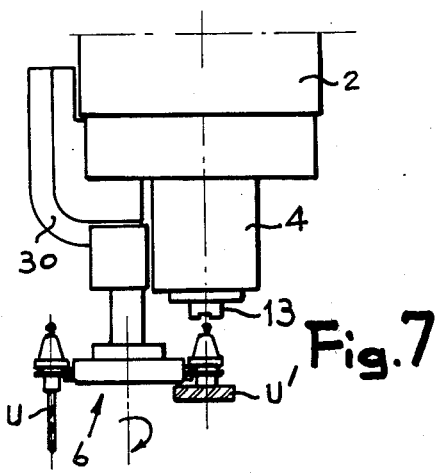
Figure 8:
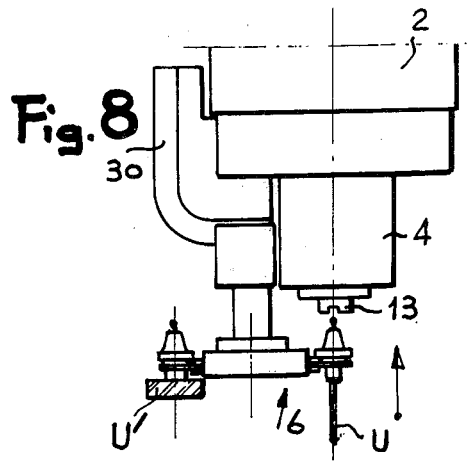
Figure 9:
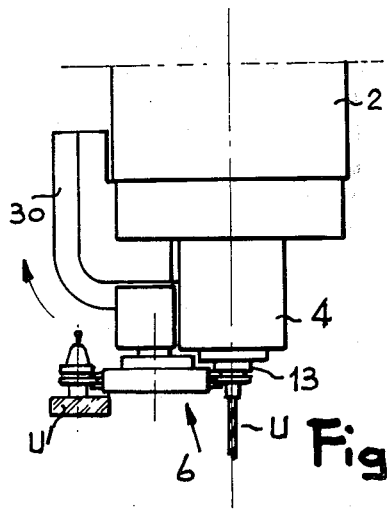
Figure 10:
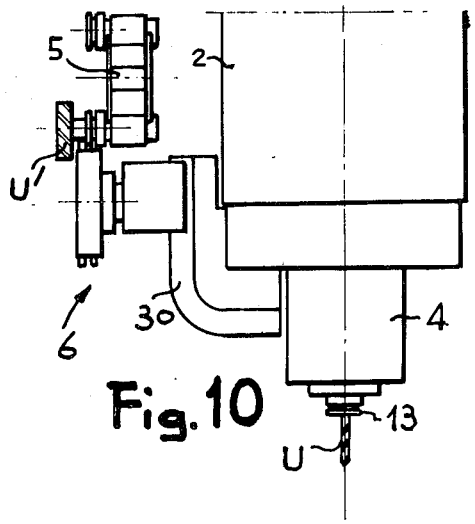

As can be seen from the sequence of figures, in FIG. 5 the device 6 picks the desired tool U from the store 5; said device then slides along the track 30 to reach, in FIG. 6, the position for removing the tool U' from the spindle 13; FIG. 7 shows the subsequent step of exchanging the tools, which involves an outward movement of the gripping arm 33 parallely to the spindle axis and a rotation of said arm by 180°; through a movement (FIG. 8) in the opposite direction to that of FIG. 7, the new tool U, previously picked from the store, is inserted on the spindle 13; the device 6 finally moves back towards the store 5 along the track 30 (FIG. 9) and delivers the replaced tool U' (FIG. 10).

The aforedescribed steps take place in a fully automatic way, according to principles and with the use of means which need not be described in detail, as they are well known in the art. It is understood that if the spindle works in a vertical position, the tool changing operations will have to be preceded by the step of rotating the head 4, so as to set the spindle in the horizontal position, and will have to be followed by the step of rotating again the head 4 in the opposite direction, so as to set the spindle back in the vertical position.

It is understood that the invention may be realized in a different way from that heretofore described in detail, with reference to the drawings of the preferred embodiment thereof. Likewise, any variants and modifications of the same will be possible and will actually appear evident to those skilled in the art. It should expressly be noted that — although for mass production machining operations on the whole, it is to be considered as a highly desirable result (besides never achieved so far) to dispose of a machine tool, adapted to work with its own tools mounted on a horizontal, and alternatively on a vertical axis, with possibility to be automatically replaced — there is nothing to prevent the spindle from taking up even other intermediate positions, between the already mentioned horizontal and vertical positions. For this purpose, some simple structural modifications will be sufficient, involving no conceptual difficulties, as any technicians, skilled in the art, will easily understand.

It is understood that the invention covers all such embodiments and any variants or modifications of the one heretofore described and illustrated, falling within the scope of the appended claims.

I claim:

1. A machine tool designed for volume production, comprising a base, a head, means mounting said head on said base for movement relative to said base in a vertical direction and in at least one horizontal direction, said head being in two parts one of which is rotatable on and relative to the other said part about a first axis inclined at an angle of 45 degrees to the horizontal, a single rotatable spindle mounted on said one part of said head for rotation relative to said one part about a second axis inclined at 45 degrees to said first axis, said spindle being parallel to said vertical direction in one rotated position of said one head part and parallel to said horizontal direction in another rotated position of said one head part whereby a tool carried by said spindle may be advanced either horizontally or vertically along the axis of said spindle, means to drive said spindle in rotation both when said spindle is oriented horizontally and when said spindle is oriented vertically thereby to perform machining with the spindle oriented either horizontally or vertically, and means carried by said head for changing tools on said spindle in a said rotated position of said one head part.

2. A machine tool as in claim 1, wherein said one part of the head is rotatably mounted on the other part by means of a hollow shaft, projecting from said one part and housing itself into a corresponding seat of the other part, said shaft carrying at its end a gearwheel, a rack that engages said gearwheel, and a fluid pressure cylinder having a piston that moves said rack thereby to control the rotation of said one head part in respect of the other head part.

3. A machine tool as in claim 2 and means for locking of the one head part with respect to the other head part, comprising: a pair of crown gears with front coupling; spring means for driving the two parts into mutual engagement; and fluid pressure means for disengaging said two parts.

4. A machine tool as in claim 1, wherein the change of the tools takes place with the head in a position corresponding to the horizontal spindle position, by means of a carriage sliding on a curved horizontal track carried by said head, between a tool-store and the spindle, said carriage comprising an arm for gripping the tools, adapted to move outwardly in the horizontal direction and rotating in a vertical plane.

* * * * *